May 14, 1935.   I. E. BLAIR   2,000,914
EQUALIZING ATTACHMENT FOR TRUCKS
Original Filed Nov. 20, 1931   3 Sheets-Sheet 1
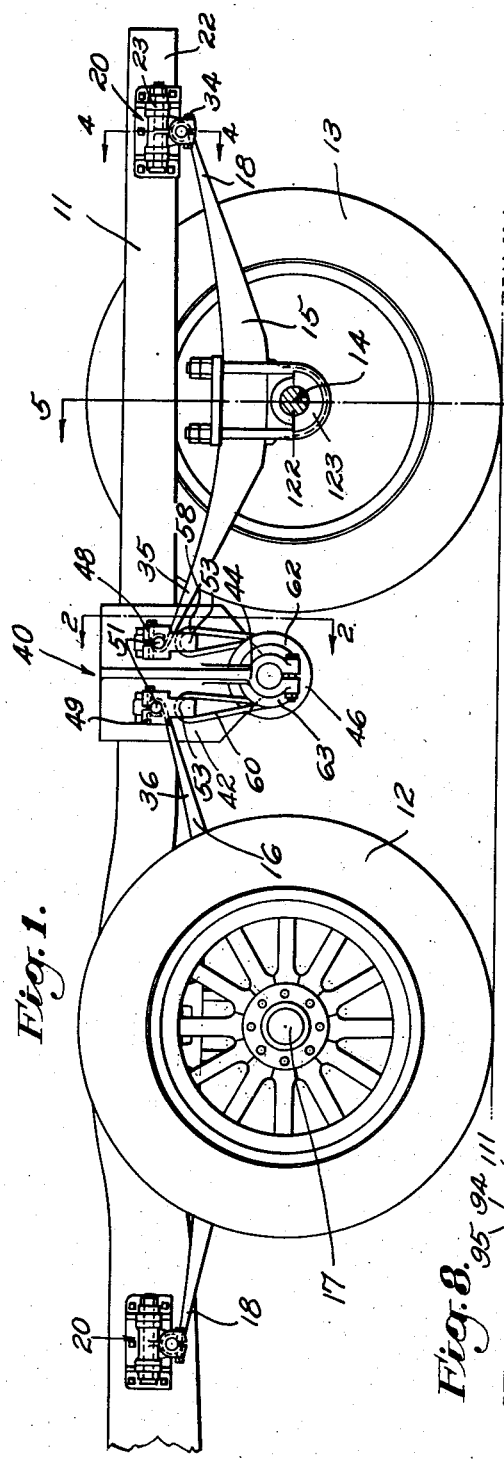
INVENTOR:
IRA E. BLAIR,
By
ATTORNEY May 14, 1935.  I. E. BLAIR  2,000,914
EQUALIZING ATTACHMENT FOR TRUCKS
Original Filed Nov. 20, 1931  3 Sheets-Sheet 2
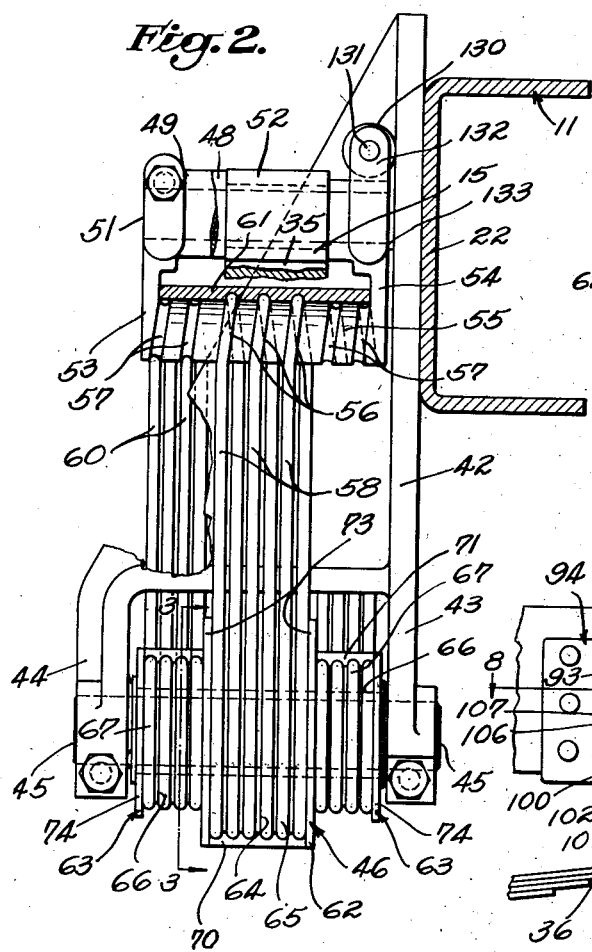
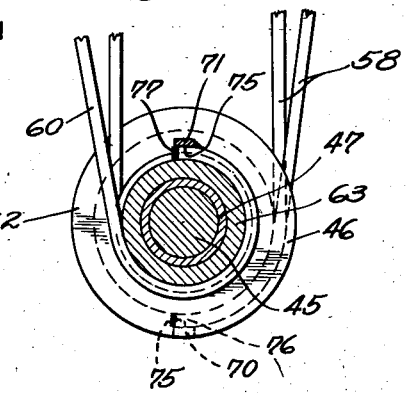
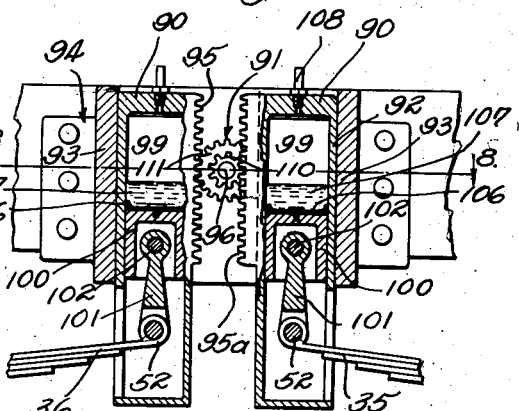
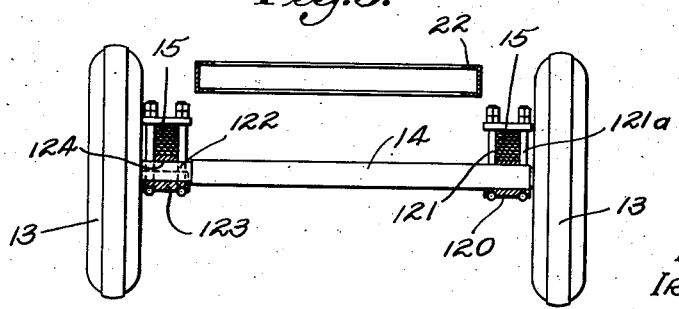
INVENTOR:
IRA E. BLAIR,
By
ATTORNEY.

May 14, 1935.  I. E. BLAIR  2,000,914
EQUALIZING ATTACHMENT FOR TRUCKS
Original Filed Nov. 20, 1931  3 Sheets-Sheet 3
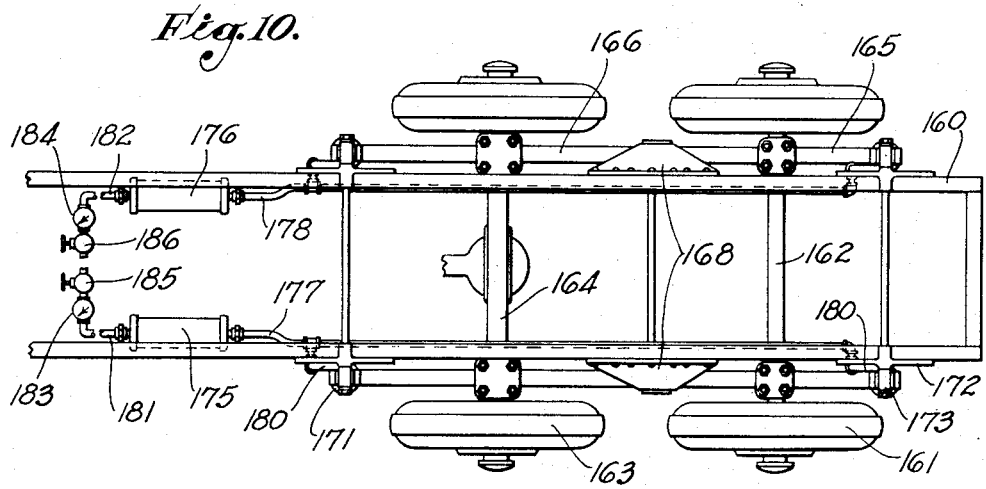
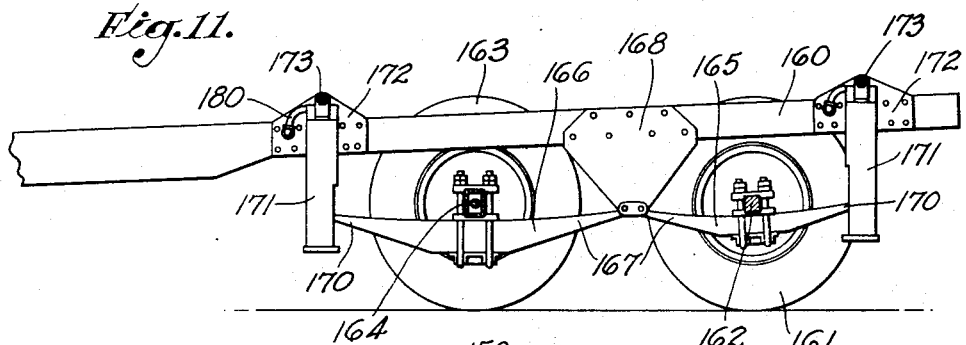
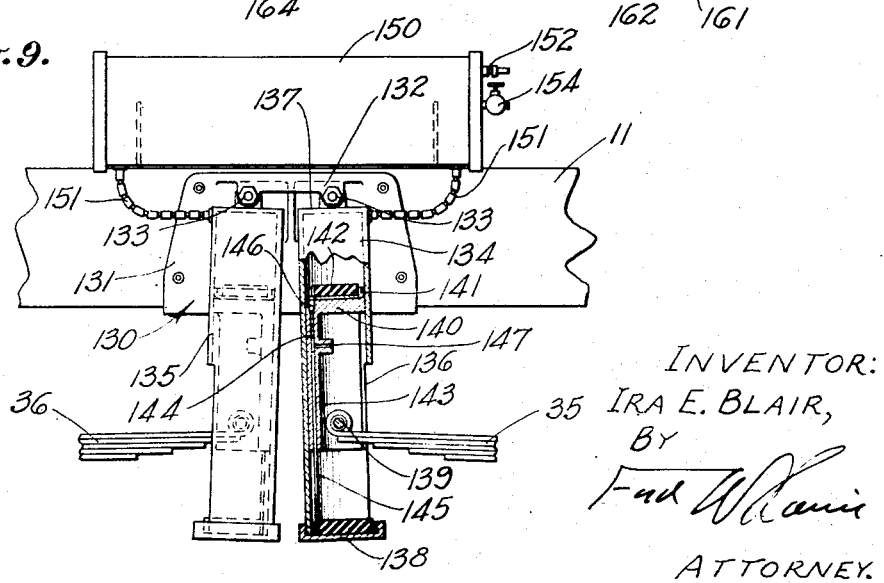
INVENTOR:
IRA E. BLAIR,
BY
ATTORNEY.

Patented May 14, 1935

2,000,914

UNITED STATES PATENT OFFICE 2,000,914

EQUALIZING ATTACHMENT FOR TRUCKS

Ira E. Blair, Los Angeles, Calif.

Application November 20, 1931, Serial No. 576,348
Renewed August 20, 1934

15 Claims. (Cl. 280—104)

My invention relates to spring supporting means for vehicles and relates particularly to load distributing means for vehicles having more than a single pair of wheels grouped together under one portion of the vehicle chassis.

It is an object of the invention to provide a spring construction for six-wheel type vehicles which will effect a desired distribution of load from the rearward portion of the truck to the four wheels situated thereunder.

It is a further object of the invention to provide a simple and effective load-proportioning means which may be used in six-wheel vehicle construction and which will occupy a minimum space so that the axles supporting the wheels at the rear end of the vehicle may be placed relatively close together. Rocker arms have been employed for this purpose, but due to the relatively large space required for such rocker arms, the axles of the wheels must be separated or the springs must be shortened. My invention gives a satisfactory equalization or load distribution with the axles at a minimum distance and with the springs maintained at full length so that satisfactory riding conditions are maintained.

It is a further object of the invention to provide a spring construction for vehicles in which two spring members are placed in end-to-end relationship and with a load-transmitting device connecting the adjacent ends of the springs with the vehicle chassis, this load-transmitting device being adapted to proportion the load received from the chassis in such a manner that a greater part of such load is transmitted to one of the pair of springs.

It is a further object of the invention to provide a device of the above character which will maintain a desired proportioning of the load supplied to the springs regardless of uneven contour of the road surface over which the vehicle is traveling.

It is a further object of the invention to provide a simple load-proportioning means for transmitting a load in unequal proportions from a chassis to a number of vehicle springs.

A further object of the invention is to provide a load-proportioning or equalizing device having especial cushioning qualities so as to make a vehicle, such as a bus, equipped therewith very smooth riding. A feature of this form of the invention is that the device includes a pair of cylinder-piston members connected with a cushion chamber in which a body of air is maintained under pressure.

Further objects and advantages of the invention will be disclosed in the following part of the specification.

Referring to the drawings, which are for illustrative purposes only,

Fig. 1 is a partly sectioned elevational view showing a preferred form of my invention in use with two pairs of wheels at the rear end of a truck chassis.

Fig. 2 is an enlarged cross section on a plane represented by the line 2—2 of Fig. 1.

Fig. 3 is a cross section through the load-proportioning device of my invention, this section being taken on a plane represented by the line 3—3 of Fig. 2.

Fig. 4 is an enlarged section on a plane represented by the line 4—4 of Fig. 1.

Fig. 5 is a cross section on a plane represented by the line 5—5 of Fig. 1.

Fig. 6 is a vertically sectioned view showing an alternative form of load-proportioning means.

Fig. 7 is a vertically sectioned view showing another form of load-proportioning means.

Fig. 8 is a cross section on a plane represented by the line 8—8 of Fig. 7.

Fig. 9 is a fragmentary elevational view showing a load distributor including cylinder-piston members hinged to the chassis of a vehicle.

Fig. 10 is a plan view of the rear end of a vehicle showing another method of mounting equalizing or load-proportioning devices.

Fig. 11 is an elevational view corresponding to Fig. 10.

In Fig. 1 of the drawings I show the rear end of a vehicle chassis 11 supported by a front pair of wheels indicated at 12 and a rear pair of wheels indicated at 13, one of the rear pair of wheels 13 being removed to show my improved simple manner of flexibly securing an axle 14 to a spring 15. The spring 15 is one of a pair which supports the axle 14, which axle 14 in turn supports the rear pair of wheels 13. Ahead of, or to the left of, the spring 15 of Fig. 1, I show a spring 16 which is one of a pair of springs supporting an axle or axle housing 17 which in turn supports the front pair of wheels 12. The springs 15 and 16 are in end-to-end relationship, and non-adjacent or outer ends 18 thereof are secured flexibly to the chassis by spring-supporting members 20 which are adapted to connect the ends 18 of the springs 15 and 16 to the chassis in such a manner that the springs may rotate freely on a longitudinal axis relative to the chassis should a twist be placed on either of the springs due to one of the pair of wheels being moved into a higher or lower plane than the other wheel of the pair, and each of the spring-supporting members is also adapted to permit rotation of the spring end 18 connected thereto on a lateral axis relative to the chassis to allow for the flexing of the spring in vertical direction in the ordinary use thereof.

As shown in Figs. 1 and 4, each of the spring-supporting members 20 includes a bracket 21 adapted to be secured to a side member 22 of the chassis, this bracket having a pair of outstanding arms 23 which are spaced apart longitudinally and support a longitudinal pin 24 on which a downwardly faced clevis 25 is pivotally mounted. The clevis 25 has a barrel portion 26 with a bearing 27 therein adapted to fit the pin 24 and has downwardly extending arms 28 which are spaced apart in lateral direction and are provided with openings 30 on a lateral axis for receiving a lateral pin 31 which engages a bearing 32 secured in a loop 33 on the end 18 of a spring 15 or 16. The bearing 32 and the end 18 of the associated spring are held between the arms 28 of the downwardly faced clevis 25, and the pin 31 is secured in the openings 30 by means of bolts 34. Each spring 15 or 16 may rotate relative to the longitudinal axis established by the pin 24, and the end 18 of such spring may rotate on a lateral axis defined by the pin 31; therefore, the connection of the outer ends 18 of the springs to the chassis 11 is universal in character. The end 35 of each spring 15 is adjacent the end 36 of a spring 16, and these adjacent ends 35 and 36 of the springs 15 and 16 are connected to the chassis 11 through a load distributor 40 which is in the character of an equalizer but which distributes a load from the chassis unequally to the adjacent ends 35 and 36 of the springs 15 and 16.

My preferred form of load distributor 40, as shown in Figs. 1, 2, and 3, includes a bracket or thrust member 42 which is secured to the side member 22 of the chassis 11 and has downwardly extending arms 43 and 44 at the lower end thereof which carry a horizontal, laterally directed shaft 45 on which a pulley member 46 having a bearing 47 is rotatably mounted. On the ends 35 and 36 of the springs 15 and 16 shackles 48 and 49 of identical form are mounted on laterally extending pins 51 which pass through loops 52 formed at the ends 35 and 36 of the springs 15 and 16. Each of the shackles 48 and 49 has downwardly extending webs 53 and 54 which support a cross bar 55 of somewhat cylindrical form and having three central grooves 56 and two pairs of end grooves 57, the central grooves 56 being adapted to receive three cable loops 58, and each pair of end grooves 57 being adapted to receive a pair of cable loops 60. To prevent the cable loops from coming out of the grooves, hold-down plates, such as shown at 61, are employed. The rotary element or pulley 46 consists of parts 62 and 63, the part 62 being a pulley of large diameter and having six grooves 64 therein adapted to receive the ends 65 of the cable loops 58, and the parts 63 consisting of relatively smaller pulleys, each having four grooves 66 therein for receiving the lower ends 67 of the cable loops 60. The large and small pulleys 62 and 63 are connected together so as to form a single rotary element or pulley 46. Outstanding walls 70 and 71, as shown in Fig. 3, extend across the peripheries of the pulleys and between the flanges 73 and 74 thereof. The walls 70 and 71 have openings 75 therein which respectively receive the extremities 76 and 77 of the cable loops 58 and 60, such cable extremities being secured in the openings 75 in the customary manner of securing cable ends. The cable loops 58 and the shackle 48 provide a flexible means for connecting the end 35 of the spring 15 to the larger pulley 62, and the cable loops 60 with the shackle 49 provide flexible means for connecting the end 36 of the spring 16 to the smaller pulleys 63. The load or downward thrust from the chassis 11, transmitted through the bracket or thrust member 40, is distributed or transmitted to the spring ends 35 and 36 in unequal proportions determined by the diameters of the pulleys 62 and 63, with the result that the downward pressure transmitted to the spring ends 35 and 36 is unequal. One reason for distributing the load unequally between the front and rear pairs of wheels 12 and 13 is so that a greater portion of the load will be placed on the wheels 12, which are the driving wheels of the vehicle. The spring ends 35 and 36 are guided vertically by rollers 130 which are mounted on pins 131 secured in lugs 132 extending upwardly from the shackles 48 and 49, these rollers bearing against a vertical wall 133 of the bracket 42 so that the bracket will be guided vertically thereby and prevent lateral motion of the adjacent ends of the springs.

In Fig. 6 I show another form of load distributor 80 for use in connecting the spring ends 35 and 36 to the chassis and for transmitting unequal loads thereto. This distributor 80 consists of a body 81 adapted to be secured to the chassis member 22 and having walls forming substantially vertical cylinders 82 and 83 therein in which pistons 84 and 85 are vertically slidable, these pistons being respectively connected through clevis-like connecting rods 86 and 87 to the spring ends 35 and 36, there being rubber bumpers for limiting the downward movement of the spring ends 35 and 36. In the cylinders 82 and 83 above the pistons 84 and 85 are bodies of oil 88, and in the upper interconnected ends of the cylinders is an air space 89. The cylinder 82 and the piston 84 are larger in diameter than the cylinder 83 and the piston 85; therefore, the downward thrust exerted on the spring end 36 will be greater than the downward thrust on the spring end 35 in proportion to the cross sectional areas of the pistons and cylinders.

In Figs. 7 and 8 I show still another form of load distributor including vertically movable members 90 interconnected by gear means 91 in such a manner that the load from the chassis will be delivered to the spring ends 35 and 36 in desired proportions. The members 90 consist of hollow bodies 92 received in vertical guides 93 of a bracket 94 and having racks 95 and 95a thereon for engaging the gear means 91 which is rotatable on a shaft 96 extended between the back of the bracket 94 and the cover plate 98 of the bracket 94. The interiors of the bodies 92 form cylinders 99 in which plungers or pistons 100 are vertically slidable. By means of shackles 101 extending downwardly from wrist pins 102 of the pistons 100, connection is made with the loops 52 on the spring ends 35 and 36. The pistons 100 are provided with sealing means such as cup leathers 106, and bodies of oil 107 are placed above the pistons 100 so as to form seals for preventing escape of air from the upper spaces of the cylinders 99, such air being pumped into the upper portions of the cylinders 99 to produce a desired pressure through air valves 108 placed in the upper ends of the movable members 90. The gear means 91 consists of a small gear 110 and a large gear 111 which are connected together so as to rotate in unison on the shaft 96. The small gear engages the rack 95, and the large gear engages the rack 95a, thus serving as a means for proportioning between the spring ends 36 and 35 the load which is delivered from the chassis to the gear means 91 through the shaft 96.

A further feature of my construction resides in a simple method of flexibly securing axle structures to the springs of a vehicle, such feature being clearly represented by the manner in which the axle 14 which supports the rear wheels 13 is secured to the springs 15, see Figs. 1 and 5. One of the springs 15 has a saddle 120 which engages one end of the axle 14 in such a manner that the axle will not rotate relative to the right-hand spring 15 shown in Fig. 5. To accomplish this manner of securing the rightward end of the axle 14 to the rightward spring 15, the rightward end of the axle 14 may be left square so as to be immovably clamped when the bolts 121 and 121a are drawn up right. The left end of the axle is turned to cylindrical form, as indicated at 122, and a spring shackle 123 having a hole 124 of round cross section therethrough surrounds the cylindrical portion 122 with such looseness that the leftward end of the axle 14 may turn within the shackle 123. The function of this flexible axle mounting is to relieve strains on the axles and the springs 15 due to one of the springs 15 being swung upwardly or downwardly to a greater extent than the other of the springs 15 due to a wheel 13 dropping into a hollow in the road or riding over a bump while the other wheel 13 remains on its original plane of travel.

In Fig. 9 I show the adjacent spring ends 35 and 36 connected to the chassis 11 by a load-proportioning or equalizing device 130 especially suited for use with vehicles carrying passengers for the reason that this device incorporates an improved cushioning means. The device 130 employs a bracket 131 which is secured to the chassis 11 and has lateral extensions 132 projecting outwardly from the upper portion thereof for receiving bolts or pins 133 by which cylinder members 134 are hingedly secured to the bracket 131. The cylinder members 134 each include a cylindrical wall 135 having a lateral opening 136 in the lower end thereof, an upper end wall 137, and a cap or stop member 138 on the lower end thereof. In each cylinder member a piston 140 is vertically slidable, this piston having a sealing means 141 on the upper end thereof in the form of a cup washer, together with a body 142 of rubber to serve as a bumper. Each piston 140 is connected to a spring end 35 or 36 by means of a cross pin 139 secured in the lower end of the piston. A portion 143 of the piston wall is thickened, and a vertical hole 144 is drilled therein to receive a plunger rod 145 which has its lower end secured to the piston member 140 so as to be held stationary. In the upper end of the hole 144 is a check valve 146, and leading into the side of the hole 144 is an air inlet opening 147. A hollow body 150 serves as a cushion chamber, and the ends thereof are connected to the upper ends of the cylinder members 134 by means of flexible conduits 151. Through an air inlet valve 152 air or gas is initially pumped into the member 150 and through the flexible conduits 151 into the spaces in the cylinder members 134 above the pistons 140, to such pressure that the pistons 140 will be forced downwardly into working positions such as shown in Fig. 9. A pressure release regulator 154 connected with the member 150 may be set to prevent the pressure within the member 150 from exceeding a predetermined value. As the vehicle travels along the road, the pistons 140 move vertically in the cylinder members 134 and relative to the stationary plunger rods 145 so that the plunger rods 145 perform a continuous pumping action, forcing a small amount of air into the spaces within the upper ends of the cylinder members to compensate for any losses of air. Any excess of pressure pumped into the cylinder members 134 by the plunger rods 145 will be released through the pressure releaser 154. The especial features of this construction are that the load-proportioning or equalizing means may be secured to the adjacent ends of spring members which are placed in close relationship; that the downward pressures exerted against the adjacent ends of the springs will be proportioned in accordance with the diameters of the pistons to which they are connected; and that the shocks due to travel over road surfaces will be very effectively cushioned in their transmission from the spring ends 35 and 36 to the bracket 131 which is in turn secured to the chassis 11. By use of a cushioning body of air in the cushion chamber 150, a relatively long vertical travel of the pistons in the cylinder members 134 is accomplished for the reason that the volume of air contained in the member 150 is of such size that the decrease in volume of the total amount of air in the equalizer or proportioning device due to upward movement of the pistons 140 will not be proportionately great, and therefore the increase of air pressure due to such decrease in air volume will not be large enough to cause abrupt shocks to be transmitted to the chassis of the vehicle.

In Figs. 10 and 11 I show the manner in which the cushioning load equalizer or proportioning cylinders shown in Fig. 9 may be employed at the outer ends of vehicle springs or at any selected ends thereof, as may be desired, instead of between adjacent ends. A chassis 160 is supported by a pair of wheels 161 carried on an axle 162 and a pair of wheels 163 carried on an axle housing 164, the axle 162 and the axle housing 164 being respectively secured to the chassis 160 by leaf springs 165 and 166, which springs are secured to the under sides of the members 162 and 164 so as to provide an increased space between these springs and the level of the chassis 160. As shown in Fig. 11, the adjacent ends 167 of the leaf springs are pivotally connected to the chassis by means of bracket plates 168 which project downwardly. The outer ends 170 of the springs 165 and 166 are secured to cylinder-piston means 171 of the character shown in Fig. 9, which cylinder-piston means 171 are hinged to mounting plates 172 at 173. In Fig. 10 I show cushion reservoirs 175 and 176 from which conduits 177 and 178 extend rearwardly along the chassis and are respectively connected to the left-hand and right-hand cylinder-piston devices 171 by flexible conduits 180. Pipes 181 and 182 extend forwardly from the reservoirs 175 and 176 to pressure gauges 183 and 184 which may be mounted on the dash of the vehicle. Connected to the pressure gauges are adjustable pressure release valves 185 and 186 for controlling the maximum pressures which may be maintained in the separate reservoirs 175 and 176. Should one side of the vehicle be loaded heavier than the other side, the pressure in the cylinder-piston means 171 at such side may be maintained at a higher value by proper regulation of the associated pressure release valve 185 or 186. Any excess of air pumped into the members 175 and 176 by the action of the small air pumps associated with the cylinder-piston means 171 will be discharged through the pressure release valve 185.

In this form of the invention, as in the form of the invention shown in Fig. 9, a cushioned and easy riding condition and a proper equalization of the load transmitted to the wheels are accomplished.

Although I have herein shown and described my invention in simple and practical form, it is recognized that certain parts or elements thereof are representative of other parts, elements, or mechanisms which may be employed in substantially the same manner to accomplish substantially the same results; therefore, it is to be understood that the invention is not to be limited to the details disclosed herein but is to be accorded the full scope of the following claims.

I claim as my invention:

1. Spring mechanism of the character described, including: a chassis member; a pair of springs in end-to-end relationship; means for securing the outer ends of said springs to said chassis member; and a load distributor secured to said chassis in proximity to the adjacent ends of said springs, said load distributor including shackles on said adjacent ends of said springs having cable-receiving bars, cable loops extending over said cable-receiving bars, and a pulley member rotatably secured to said chassis, the ends of said cable loops being secured to peripheral portions of said pulley member at unequal distances from the axis of rotation thereof so as to transmit unequal loads to said adjacent ends of said springs.

2. Spring mechanism of the character described, including: a chassis member; a pair of springs in end-to-end relationship; means for securing the outer ends of said springs to said chassis member; and a load distributor connected to the adjacent ends of said springs, said distributor having a pair of connected pulley members of unequal diameters, means for rotatably connecting said pulley members to said chassis member, and a complement of relatively small flexible cables connecting each of said pulley members to one of said adjacent ends of said springs, to transmit said load unequally to said adjacent ends of said springs.

3. Spring mechanism of the character described, including: a chassis member; a pair of springs in end-to-end relationship; means for securing the outer ends of said springs to said chassis member; and a load distributor connected to the adjacent ends of said springs, said distributor having a pair of connected pulley members of unequal diameters, means for rotatably connecting said pulley members to said chassis member, and flexible members connecting peripheral portions of said pulley members to said adjacent ends of said springs, to transmit said load unequally to said adjacent ends of said springs.

4. Spring mechanism of the character described, including: a chassis member; a pair of springs in end-to-end relationship; means for securing the outer ends of said springs to said chassis member; and a load distributor connected to the adjacent ends of said springs, said distributor having a pair of connected pulley members of unequal diameters, means for rotatably connecting said pulley members to said chassis member, and cables connecting peripheral portions of said pulley members to said adjacent ends of said springs, to transmit said load unequally to said adjacent ends of said springs.

5. Spring mechanism of the character described, including: a chassis member; a pair of springs in end-to-end relationship; means for securing the outer ends of said springs to said chassis member; and a load distributor connected to the adjacent ends of said springs, said distributor having a pair of connected rotary elements of unequal diameter, means rotatably connecting said elements to said chassis member, and cables connecting peripheral portions of said elements to said adjacent ends of said springs, to transmit said load unequally to said adjacent ends of said springs.

6. Spring mechanism of the character described, including: a chassis member; a pair of springs in end-to-end relationship; means for securing the outer ends of said springs to said chassis member; and a load distributor connected to the adjacent ends of said springs, said distributor having a pair of connected rotary elements of unequal diameter, means rotatably connecting said elements to said chassis member, and flexible means connecting peripheral portions of said elements to said adjacent ends of said springs, to transmit said load unequally to said adjacent ends of said springs.

7. Spring mechanism of the character described, including: a chassis member; a pair of springs in end-to-end relationship; means for securing the outer ends of said springs to said chassis member, said means being adapted to permit a free lateral and longitudinal rotation of said springs relative to said chassis member; and a load distributor connected to the adjacent ends of said springs, said distributor having a pair of connected rotary elements of unequal diameter, means rotatably connecting said elements to said chassis member, and parts connecting peripheral portions of said elements to said adjacent ends of said springs, to transmit said load unequally to said adjacent ends of said springs.

8. Spring mechanism of the character described, including: a chassis member; a pair of springs in end-to-end relationship; means for securing the outer ends of said springs to said chassis member; and a load distributor connected to the adjacent ends of said springs, said distributor having a pair of connected rotary elements of unequal diameter, means rotatably connecting said elements to said chassis member, and parts connecting peripheral portions of said elements to said adjacent ends of said springs, to transmit said load unequally to said adjacent ends of said springs.

9. Spring mechanism of the character described, including: a chassis member; a pair of springs in end-to-end relationship; means for securing the outer ends of said springs to said chassis member, said means being adapted to permit a free lateral and longitudinal rotation of said springs relative to said chassis member; and a load distributor connected to the adjacent ends of said springs, and to said chassis member, said distributor having a pulley member rotatably connected to said chassis member and cables secured to said pulley member at different radial distances from the axis of rotation thereof and to the adjacent ends of said springs.

10. Spring mechanism of the character described, including: a chassis; a pair of springs on one side of said chassis; a pair of springs on the opposite side of said chassis, each of said pairs of springs being in end-to-end relationship with their adjacent ends close together; means for securing the outer ends of said springs to said chassis; a load distributor for each pair of said springs, each of said distributors comprising a pulley member so connected to said chassis as to receive a load therefrom and flexible members connected to said springs and connected to said pulley member at unequal distances from the axis of rotation thereof so as to distribute said load in predetermined proportions to the adjacent ends of a pair of said springs; wheels for said chassis; and a wheel-supporting axle structure extending across and secured to one of said springs on one side of said chassis and one of said springs on the opposite side of said chassis, one end of said axle structure being secured to one of said springs in a manner to rotate relative to such spring on an axis lateral with respect to said chassis, and the other end of said axle structure being non-rotatably secured to the other of said springs.

11. Spring mechanism of the character described, including: a chassis; a pair of springs on one side of said chassis; a pair of springs on the opposite side of said chassis, each of said pairs of springs being in end-to-end relationship with their adjacent ends close together; means for securing the outer ends of said springs to said chasis; a load distributor for each pair of said springs, each of said distributors comprising a pulley member so connected to said chassis as to receive a load therefrom and flexible members connected to said springs and connected to said pulley member at unequal distances from the axis of rotation thereof so as to distribute said load in predetermined proportions to the adjacent ends of a pair of said springs; wheels for said chassis; and a wheel-supporting axle structure extending across and secured to one of said springs on one side of said chassis and one of said springs on the opposite side of said chassis, one end of said axle structure being secured to one of said springs in a manner to rotate relative to such spring on an axis lateral with respect to said chassis.

12. Spring mechanism of the character described, including: a chassis member; a pair of springs in end-to-end relationship; means for securing the outer ends of said springs to said chassis member; a load distributor for connecting the adjacent ends of said springs to said chassis member, said distributor including a member rotatably secured to said chassis member and connecting means extending from said adjacent ends of said springs to points on said rotatable member disposed at different radial distances from the center of rotation of said rotatable member; and means for vertically guiding said adjacent ends of said springs relative to a vertical longitudinal plane.

13. Spring mechanism of the character described, including: a chassis member; a pair of springs in end-to-end relationship; means for securing the outer ends of said springs to said chassis member; a load distributor for connecting the adjacent ends of said springs to said chassis member, said distributor including a member rotatably secured to said chassis member and connecting means extending from said adjacent ends of said springs to points on said rotatable member disposed at different radial distances from the center of rotation of said rotatable member; and roller means for vertically guiding said adjacent ends of said springs relative to a vertical longitudinal plane.

14. Spring mechanism of the character described, including: a chassis member; a pair of springs in end-to-end relationship; means for securing the outer ends of said springs to said chassis member; and a load distributor secured to said chassis in proximity to the adjacent ends of said springs, said load distributor including a pulley member rotatably secured to said chassis member, shackles on said adjacent ends of said springs having cable-receiving bars, and cable loops extending over said cable-receiving bars and secured to peripheral portions of said pulley member, there being means for holding said cable loops at unequal distances from the axis of said pulley member.

15. Spring mechanism of the character described, including: a chassis member; a pair of springs in end-to-end relationship; means for securing the outer ends of said springs to said chassis member; and a load distributor connected to the adjacent ends of said springs, said distributor comprising a rotary member rotatably secured to said chassis member, a pair of flexible members each of which has one end secured to said rotary member and the other end secured to an adjacent spring end, and means for holding said flexible members at different distances from the axis of rotation of said rotary member, whereby to transmit unequal loads to said adjacent ends of said springs.

IRA E. BLAIR.